(12) United States Patent
Garg

(10) Patent No.: US 6,771,611 B1
(45) Date of Patent: Aug. 3, 2004

(54) FRAME GENERATION CIRCUIT AND METHOD

(75) Inventor: Atul Garg, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 773 days.

(21) Appl. No.: 09/728,005

(22) Filed: Dec. 1, 2000

(51) Int. Cl.$^7$ ................................ H04L 5/14
(52) U.S. Cl. ........................ 370/272; 370/471
(58) Field of Search .................... 370/292, 471; 375/152, 231, 343

(56) References Cited

U.S. PATENT DOCUMENTS 5,216,519 A * 6/1993 Daggett et al. ............. 370/292
5,757,845 A * 5/1998 Fukawa et al. ............. 375/152
6,307,883 B1 * 10/2001 Kanada et al. ............. 375/231
6,724,837 B1 * 4/2004 Zhou ......................... 375/343

* cited by examiner

Primary Examiner—Salvatore Cangialosi
(74) Attorney, Agent, or Firm—Renner, Otto, Boisselle & Sklar, LLP

(57) ABSTRACT

A network transmitter for generating frames of data for transmission is provided. The transmitter includes a frame generation circuit with a register storing a bit sequence corresponding to a network standard training bit sequence. A multiplexer includes a first input receiving bits from the register corresponding to the network standard training bit sequence and a second input receiving bits representing the data for transmission.

16 Claims, 3 Drawing Sheets

FRAME GENERATION CIRCUIT AND METHOD

TECHNICAL FIELD

The present invention relates generally to network interfacing, and more particularly, to a frame generation circuit in a transmitter operating in a frame switched multiple access network.

BACKGROUND OF THE INVENTION

Networks serve the purpose of coupling data between many remotely spaced computing devices, such as computers, file servers, printers etc., so that valuable computing resources can be shared amongst the various devices.

A commonly known technique for transmitting data across a network is to break the data file into smaller frames, each of which is individually modulated onto the carrier and transmitted to the destination. At the destination, the carrier is demodulated to recover the data and the frames are sequenced and the data file is recovered.

Each frame includes a portion of the data file along with overhead data for routing the frame to the destination device. When such technique is used in a network, the network is commonly known as a frame-switched network or packet-switched because each frame, or packet, can be routed to a different destination across a multiple access topology.

In the absence of any distortion of the carrier signal across the network medium, the received carrier would be identical in phase, amplitude, and frequency to the transmitted carrier and could be demodulated without error using known mixing techniques, the digital data could be recovered using known sampling algorithms, and the data file can be readily recovered by simply re-sequencing the frames.

However, the network topology tends to distort the high frequency carrier signal. In a multiple access cable network, the distortions are typically due to reflections of the transmitted carrier caused by numerous branch connections and different lengths of such branches. Such problems are even more apparent in a network which uses home telephone wiring cables as the network cable medium because the numerous branches and connections are typically designed for transmission of plain old telephone system POTS signals in the 0.3–3.4 kilohertz frequency range and are not designed for transmission of high frequency carrier signals on the order of 7 Megahertz.

A typical approach for recovering transmitted data frames at a receiver operating in such an environment includes the use of an adaptive equalizer for filtering noise and distortion on the received carrier signal. In theory, an equalized signal should match the signal originally transmitted such that a slicer can accurately map the signal to defined constellation points to recover the originally transmitted data.

To operate an adaptive equalizer, each frame includes a training sequence as part of its overhead. The training sequence is a sequence of pre-defined data bits and, during receipt of the training sequence at the receiver, various equalizer coefficients can be calculated and tested to determine the correct combination of equalizer coefficients. Because the pre-defined data bit sequence is known, the equalized signal can be readily compared to the predefined data bits to determined optimal coefficients for receipt for the frame.

The predominant method of generating and transmitting each frame in a frame switched multiple access network includes 1) parsing the data file into segments consistent with the desired frame size, 2) adding the overhead to each data segment including frame sequencing, destination routing/addressing, error correction, and training sequence; 3) encoding the frame into a low frequency base data signal; and 4) modulating the base data signal onto a high frequency carrier signal. The high frequency carrier signal is then transmitted across a network medium, via differential voltage, RF signal, modulated illumination, or other physical layer modulation scheme to a remote computing station. At the remote computing station, the high frequency carrier signal must be received and demodulated to recover the original base data signal.

Typically the transmitter includes a processor which executes code for parsing the data file into frames and generating the overhead bits and training sequence bits. A physical layer circuit then modulates the data onto a carrier which, in the case of a QAM modulation scheme includes mapping the data to defined constellation points to generate a base band data signal and mixing the base band data signal up to carrier frequency.

Processor based circuits for performing such frame generation functions are relatively expensive and can consume substantial power. This requires high-speed and costly digital signal processing circuits. Such circuits consume substantial of power and are relatively expensive. As a result, such circuits are not practical in battery powered devices for power consumption reasons, and are unsuitable for inexpensive consumer network devices such as smoke detectors, door openers and other devices requiring inexpensive network access.

Therefore, based on recognized industry goals for size, cost, and power reductions, what is needed is a device and method for frame generation which does not suffer the disadvantages of known systems.

SUMMARY OF THE INVENTION

A first aspect of the present invention is to provide a network transmitter for generating data frames for transmission on a network medium. The transmitter includes a frame generation circuit which comprises a register for storing a predefined bit sequence corresponding to a network standard training bit sequence.

A first multiplexer includes a first input coupled to the register for receiving the predefined bit sequence and a second input for receiving bits representing the data for transmission. The first multiplexer is controlled by a select signal and generates an output in accordance with the select signal.

A schedule circuit drive the select signal to provide for the first multiplexer to select bits from the register during a portion of the frame corresponding to a frame training sequence and to select bits representing the data during a portion of the frame corresponding to a data portion.

Further, the schedule circuit may drive the select signal to cause the first multiplexer to select bits from the register during a portion of the frame corresponding to an end of frame sequence.

The network transmitter may further include a media access controller which receives a data file for transmission from an upper layer application and makes the bits representing the data available to the frame generation circuit on a data bus. The data bus may be a 4-bit bus and the frame generation circuit may include a serializer register for converting the 4-bit nibble into serial data.

The frame generation circuit may further include a scrambler which receives the bits representing data and mixes the bits into a scrambled format to provide for adequate bit transitions to limit electromagnetic noise outside a predefined transmission band. A second multiplexer may select between unscrambled bits and scrambled format bits in accordance with a bypass signal driven by the schedule circuit. The bypass signal provides for the selection of unscrambled bits during a first unscrambled portion of the frame and scrambled format bits during a scrambled portion of the frame.

The output of the first multiplexer may be coupled to a mapper which generates a baseband data signal in accordance with an encoding constellation. The mapper may operate at multiple payload encoding rates. As such, the schedule circuit may provide a signal to the media access controller indicating a data rate at which the media access controller may provide data bits to the frame generation circuit to correspond to the payload encoding rate.

Further, the mapper may operate at multiple baud rates and the signal to the media access controller may provide for a data rate which corresponds to the payload encoding rate and the baud rate.

A second aspect of the present invention is to provide a method of generating frames in a network transmitter. The method comprises: a) making data to be transmitted available on a data bus; b) storing a predefined bit sequence in a register corresponding to a network standard training bit sequence; c) selecting between the predefined bit sequence and the data for transmission in accordance with a select signal to generate output data; and d) generating the select signal to select bits from the register during a portion of the frame corresponding to a frame training sequence and generating the select signal to select the data for transmission during a portion of the frame corresponding to a data portion. Further, the select signal may be generated to select bits from the register during a portion of the frame corresponding to an end of frame sequence.

The method may further include receiving a data file for transmission from an upper layer application and making data available to the frame generation circuit on the data bus. The data bus may be a 4-bit data bus and the method may include serializing the 4-bit nibbles to generate serial data.

Further yet, the method may include scrambling the serial data to provide scrambled format data which includes an adequate frequency of bit transitions limit electromagnetic noise outside a predefined transmission band. The data may be selectively scrambled in accordance with a bypass signal. The bypass signal may be generated to provide for selecting scrambled data bits during a scrambled portion of the frame and selecting data bits from the media access controller during an unscrambled portion of the frame.

A mapping step may be included to map the output data to predefined constellation coordinates to generate a base band data signal. The mapping step may include selecting between at least two predefined constellations, each representing a separate payload encoding. As such, the method further providing a signal to the media access controller indicating a data rate at which the media access controller may provide data, the data rate corresponding to the payload encoding rate. Further, the mapping step may include selecting between at least two baud rates and the signal to the media access controller may provide a data rate corresponding to both the payload encoding rate and the baud rate.

DESCRIPTION OF THE PREFERRED EMBODIMENTS

Figure 1:
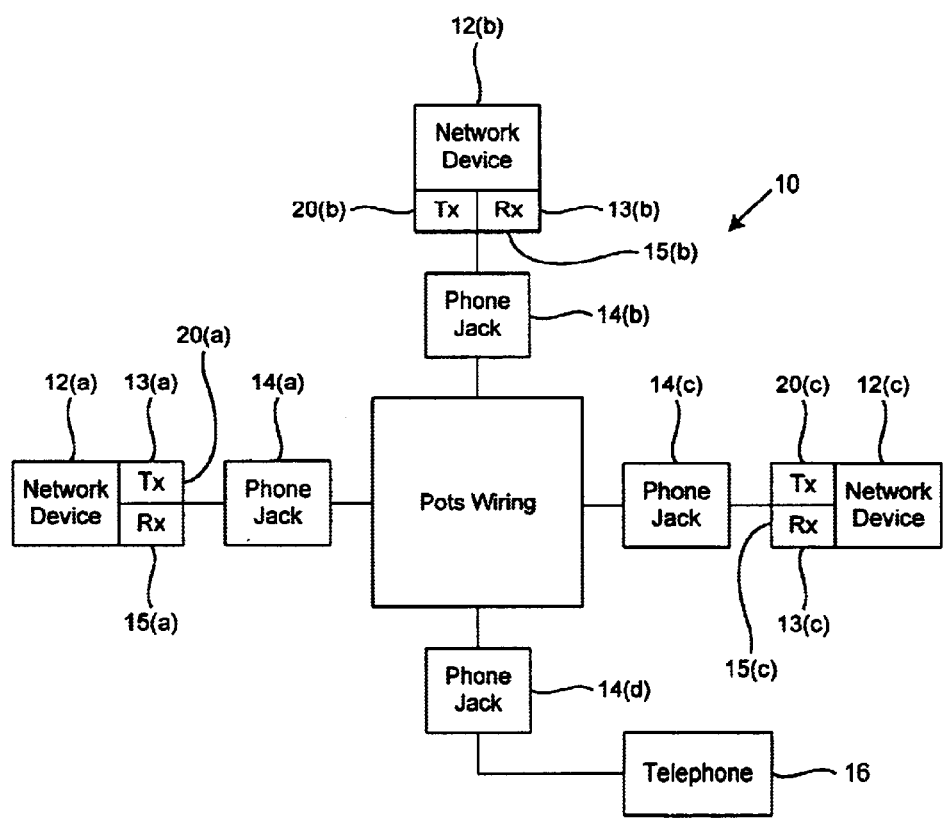
FIG. 1 is block diagram representing a local area network in accordance with an embodiment of this invention.

The present invention will now be described in detail with reference to the drawings. In the drawings, like reference numerals are used to refer to like elements throughout.

Referring to FIG. 1, a network 10 includes a network backbone 18 which interconnects a plurality of data ports 14(a)–14(d). In the preferred embodiment, the network backbone 18 comprises the plain old telephone service (POTS) wiring existing in a household environment and the data ports 14(a)–14(d) comprise the RJ-11 phone jacks positioned at the termination of each branch of the POTS wiring. As such, a POTS telephone 16 can be coupled to one of the data ports 14(d) for normal telephone operation in the 0.3–3.4 KHz frequency band simultaneous with network data traffic in a frequency band on the order of 7 MHz.

A plurality of network devices 12(a)–12(c) are each coupled to one of the data ports 14(a)–14(b) respectively and such network devices 12(a)–12(c) communicate data to other network devices 12(a)–12(c) across the network 10 utilizing a predefined data communication protocol such as the HPNA 1.0 and/or 2.0 protocol as promulgated by the Home Telephone Networking Association (HPNA). HPNA comprises a consortium of companies including Advanced Micro Devices of Sunnyvale Calif.

Each of the network devices 12(a)–12(c) may comprise a typical desk top computer and/or server, printer, or other consumer network device or appliance and is coupled to the network 10 utilizing a network interface circuit 13(a)–13(c). In a network device 12 such as a computer or server, the network interface circuit 13 may be embodied in a network interface card plugged into one of the computer's expansion slots or PCMCIA ports. However, in other consumer appliances or devices, the network interface circuit may be embedded with other circuits for operating such appliance or device.

Each network interface circuit 13(a)–13(c) will typically include a network transmitter circuit 20(a)–20(c) for broadcasting frames on the network backbone 18 and a network receiver circuit 15(a)–15(c) for detecting and receiving frames from the network backbone 18. However, as discussed in U.S. Patent application Ser. No. 09/517,351, filed Mar. 2, 2000, entitled Network Appliance with Simplified Network Transmitter, which includes common inventorship and is commonly assigned with the present application, it is envisioned the network interface circuit 13 in certain consumer appliances or devices may include a network transmitter circuit 20 only.

Figure 2:
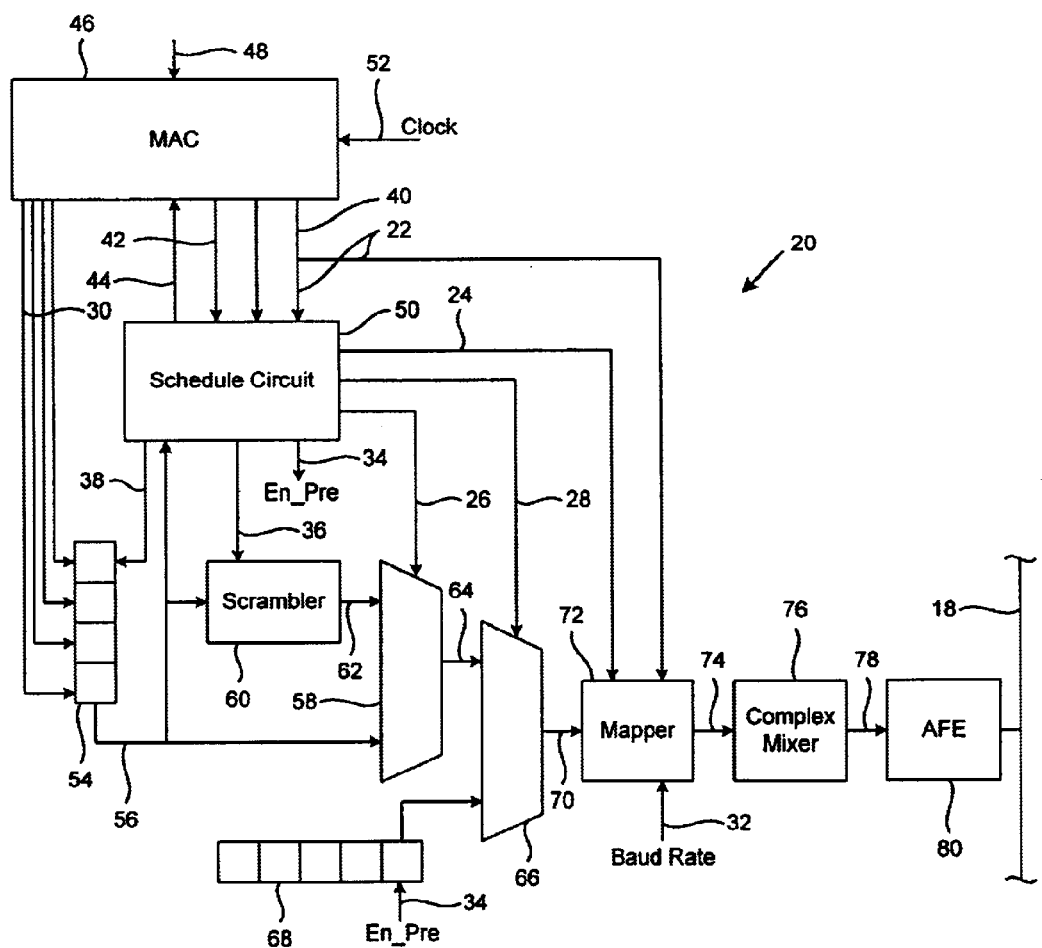
FIG. 2 is a block diagram of a transmitter circuit useful in operation of a network device in accordance with one embodiment of this invention.

Referring to FIG. 2, a block diagram of the network transmitter circuit 20 is shown. The network transmitter circuit includes a media access controller 46 which receives data files for transmission on internal bus 48 from an upper layer application being executed by the network device processor (not shown). When the media access controller 46 has a data file prepared for transmission and the network medium 18 is available for transmission, the media access controller 46 asserts a transmit enable signal on line 42 to a schedule circuit 50. The media access controller 46 then makes the data file available on a 4-bit transmit data bus 30. In the preferred embodiment, the rate at which data is placed on the transmit data bus 30 is controlled by a transmit rate signal on line 44 from the schedule circuit 50 to the media access controller 46. The media access controller 46 is driven by a 32 MHz clock signal 52 and the transmit rate signal on line 44 provides an indication of how many clock cycles should be skipped between each 4-bit nibble placed on the transmit data bus 30. For example, a 32 M-bit data rate can be achieved by placing a 4-bit nibble on the transmit data bus every fourth clock cycle while a 16 M-bit data rate can be achieved by placing a 4-bit nibble on the transmit data bus every eighth clock cycle.

The transmit data bus 30 is coupled to a serializer 54 which may be a 4-bit shift register. The serializer 54 converts the 4 bits of parallel data on the transmit data bus 30 to serial data on line 56. A serializer enable signal on line 38 controls the serializer 54 such that data is clocked-out of the serializer 54 at the data rate of line 56 and is in phase with 4-bits of data being clocked-into the serializier 54 on the transmit data bus 30.

Line 56 is input to both a first input of a multiplexer 58 and to a scrambler 60. The scrambler 60 operates in a known manner to scramble the data on line 56 to assure that the frequency of bit transitions does not deviate from a defined band to assure that the signal ultimately transmitted on the network backbone 18 does not include excessive side band noise. The scrambler 60 is driven by a scrambler enable signal on line 36 which clocks the scrambler at the same rate as data on line 56. The output of the scrambler 60 is input to the second input of the multiplexer 58.

Figure 4:
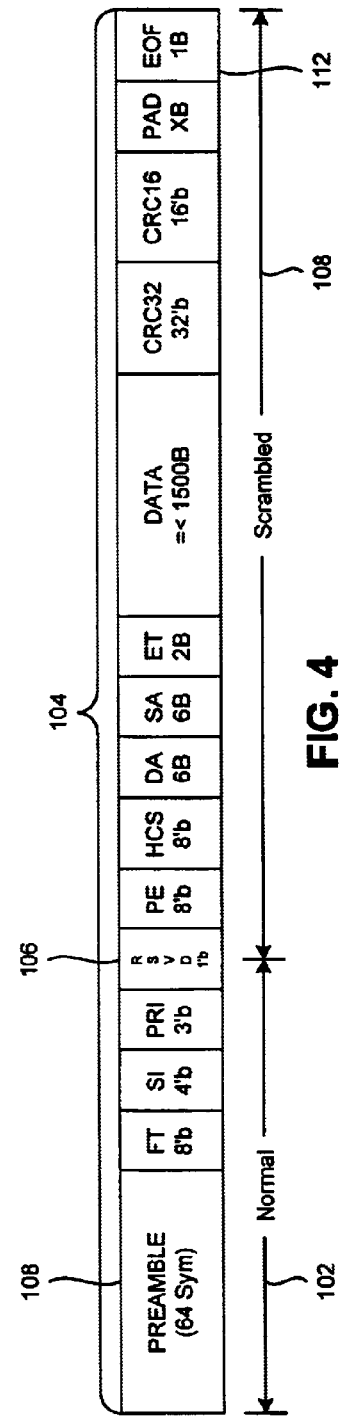
FIG. 4 is a diagram representing a frame of data useful in the practice of the present invention.

Referring to FIG. 4 in conjunction with FIG. 2, because scrambled data can only be recovered in a receiver if a de-scrambler in the receiver operates in the same phase as the scrambler 60 in the transmitter circuit 20, the beginning portion 102 of each frame 104 is transmitted unscrambled and a particular bit sequence 106 (included in the overhead) is used to enable the scrambler 60 and the de-scrambler in the receiver to assure that both operate in the same phase. Typically, the bit sequence 106 for enabling the scrambler 60 is after the training sequence and the training sequence 108 itself has the correct frequency of bit transitions to assure that there is not excessive side band noise in the modulated carrier.

The multiplexer 58 selects between unscrambled data on line 56 and between scrambled data on line 62 in accordance with a bypass signal from the schedule circuit 50 on line 26. The bypass signal provides for the multiplexer 58 to select unscrambled bits on line 56 (and output unscrambled bits on line 64) during the first portion 102 of the frame 104 prior to the scrambler enable bit sequence 106 and selects scrambled bits on line 62 (and outputs scrambled bits on line 64) during a scrambled portion 108 of the frame 104 occurring after the scrambler enable bit sequence 106.

Line 64 is coupled to the first input of a second multiplexer 66. Coupled to the second input of the second multiplexer 66 is the output of a register 68. The register 68 stores data representative of the predefined training bit sequence. In the preferred embodiment, the training bit sequence is a 128-bit sequence which comprises four cycles of a 32-bit sequence. As such, the register 68 stores the 32-bit sequence. The second multiplexer 66 is driven by a select signal from the schedule circuit 50 on line 28. The select signal provides for data to be selected from the register 68 on the second input during the training sequence 108 of each frame 104 and for data to be selected from line 64 on the first input during the other portions of the frame 104. Additionally, in the preferred embodiment, an end of frame sequence 112 is identical to one cycle of the 32-bit sequence comprising the training sequence such that the select signal on line 28 also selects data from the register 68 on the second input during the end of frame sequence.

The output of the second multiplexer on line 70 is input to the mapper 72. In the preferred embodiment, the mapper utilizes an encoding constellation for each payload (e.g. 2, 4, 6, and 8 bits/baud) to define a sequence of I-channel values and Q-channel values at base band frequency on line 74 which represent the sequential data input to the mapper on line 70.

The mapper operates under control of a baud rate signal on line 32 an enable mapper signal on line 24, both of which are provided by the schedule circuit 50. The enable mapper signal is a 3-bit signal which indicates a payload encoding and provide for the mapper to utilize appropriate number of bits from the input on line 70 for each baud cycle in accordance with the following table.

| | |
|---|---|
| 001 | 2-bits/baud |
| 010 | 3-bits/baud |
| 011 | 4-bits/baud |
| 100 | 5-bits/baud |
| 101 | 6-bits/baud |
| 110 | 7-bits/baud |
| 111 | 8-bits/baud |

In operation, the schedule circuit 50 monitors incoming data on line 56 and utilizes such data to latch appropriate data fields in its internal registers for controlling the scrambler enable signal on line 36, the mapper enable signal on line 32, the baud rate signal on line 24, and each of the multiplexer control signals on lines 26 and 28.

The base band I-channel values and Q-channel values as output by the mapper 72 on bus 74 are input to a complex mixer 76 which modulates the values onto a carrier frequency signal. The output of the complex mixer on line 78 is input to an analog front end 80 which includes appropriate amplifiers for broadcasting the modulated carrier onto the network medium 18.

Figure 3:
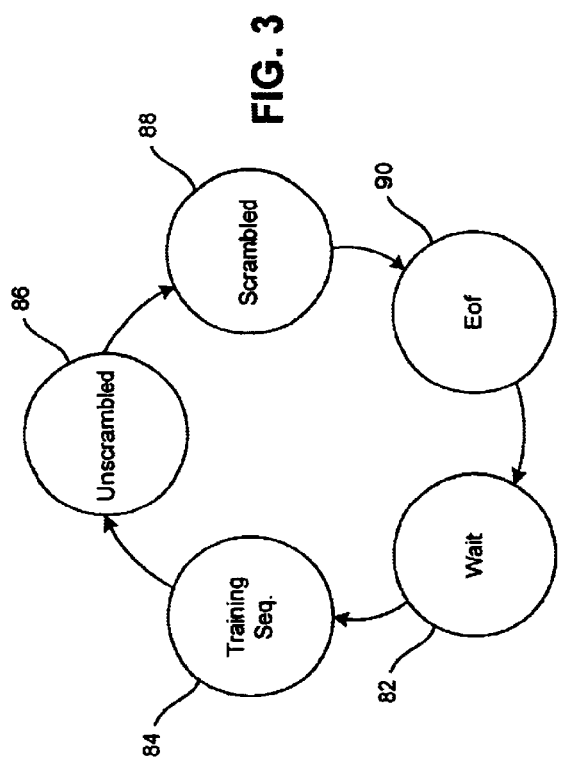
FIG. 3 is a state machine diagram of operation of a schedule circuit in accordance with one embodiment of this invention.

Referring to FIG. 3, in conjunction with FIG. 2, a state machine diagram of the operation of the schedule circuit 50 is shown. In the wait state 82, the schedule circuit 50 is merely waiting for the media access controller 46 to insert a transmit enable signal on line 42 indicating that data is to be transmitted. Upon receipt of such signal from the media access controller 46, the schedule circuit 50 transitions to a training sequence state 84.

In the training sequence state 84, the schedule circuit 50 is controlling: i) the select signal on line 28 to provide for the second multiplexer 66 to select data from the register 68; ii) the enable pre-amble signal on line 34 to enable the register to clock out the training sequence data at the appropriate bit rate; and iii) the mapper enable signal on line 24 to enable the mapper to begin encoding the data output from the second multiplexer 66.

Once the training sequence is complete (four cycles of the data stored in the register 68), the schedule circuit 50 transitions to an unscrambled state 86. In the unscrambled state 86, the schedule circuit 50 continues to provide the mapper enable signal on line 24, however, the select signal on line 28 is switched to provide for the second multiplexer 66 to select data on line 64 and the select signal on line 26 is controlled to provide for the multiplexer 58 to select unscrambled data on line 56.

After detecting the bit sequence for enabling the scrambler, the schedule circuit 50 transitions to the scrambled state 88. In the scrambled state 88, the schedule circuit 50 continues to; i) provide the mapper enable signal on line 24; and ii) provide the select signal on line 28 to control the second multiplexer 66 to select data on line 64. However, the select signal on line 26 is switched to provide for the multiplexer 58 to select scrambled data on line 62

After transmitting the data supplied by the media access controller 46, the schedule circuit 50 transitions to the end of frame state 90. In the end of frame state 90 and similar to the training state 84, the schedule circuit 50 is controlling: i) the select signal on line 28 to provide for the second multiplexer 66 to select data from the register 68; ii) the enable pre-amble signal on line 34 to enable the register to clock out the end of frame sequence at the appropriate bit rate; and iii) the mapper enable signal on line 24 to enable the mapper to continue encoding the data output from the second multiplexer 66.

After the transmitter 20 has complete transmitting the entire frame, including the end of frame sequence, the schedule circuit 50 transitions back to the wait state 82 where it again waits for the media access controller 46 to assert the transmit enable signal on line 22.

It should be appreciated that the above described device and methods If provide for a simplified transmitter logic circuit for performing frame generation functions in a packet switched multiple access network environment.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A network transmitter generating data frames of data for transmission on a network medium, the transmitter including a frame generation circuit comprising:
   a) a register storing a predefined bit sequence corresponding to a network standard training bit sequence;
   b) a multiplexer with a first input receiving bits from the register corresponding to the network standard training bit sequence and a second input receiving bits representing the data for transmission, the multiplexer generating an output signal in accordance with a select signal;
   c) a schedule circuit driving the select signal to select bits from the register during a portion of the frame corresponding to a frame training sequence and driving the select signal to select the data for transmission during a portion of the frame corresponding to a data portion; and
   d) a scrambler that receives the data from a media access controller and provides the bits representing data for transmission to the multiplexer in a scrambled format, the scrambled format providing for adequate bit transitions to limit electromagnetic noise outside a predefined transmission band; and
   e) a second multiplexer selecting between data bits from the media access controller and data bits in the scrambled format and having an output coupled to the second input of the multiplexer and the schedule circuit further provides a bypass signal to the second multiplexer driving the second multiplexer to select scrambled data bits during a scrambled portion of the frame and to select data bits from the media access controller during an unscrambled portion of the frame.

2. The network transmitter of claim 1, wherein the schedule circuit further drives the select signal to select bits from the register during a portion of the frame corresponding to an end of frame sequence.

3. The network transmitter of claim 1, wherein the media access controller receives a data file for transmission from an upper layer application and makes data available to the frame generation circuit on a data bus.

4. The network transmitter of claim 3, further including a serializer receiving data bits on the data bus from the media access controller and making the data bits available to the scrambler in a serial format.

5. The network transmitter of claim 1, further including a mapper coupled to the first multiplexer, the mapper receiving the output signal, and generating a base band data signal in accordance with an encoding constellation.

6. The network transmitter circuit of claim 5 wherein the mapper operates at multiple payload encoding rates and the schedule circuit provides a signal to the media access controller indicating a data rate at which the media access controller may provide data to the frame generation circuit, the data rate corresponding to the payload encoding rate.

7. The network transmitter circuit of claim 6 wherein the mapper further operates at multiple baud rates and the signal to the media access controller corresponds to the payload encoding rate and the baud rate.

8. A method of generating data frames in a network transmitter, the method comprising:
   a) making data from a media access controller available on a data bus;
   b) scrambling the data from the media access controller,
   c) generating a bypass signal and, in accordance with the bypass signal, selecting scrambled data bits during a scrambled portion of the frame and selecting data bits from the media access controller during an unscrambled portion of the frame, the selected scrambled and unscrambled data bits defining data for transmission;
   d) storing a predefined bit sequence in a register corresponding to a network standard training bit sequence;
   e) selecting between the network standard training bit sequence and the data for transmission in accordance with a select signal to generate output data; and
   f) generating the select signal to select bits from the register during a portion of the frame corresponding to a frame training sequence and driving the select signal to select the data for transmission during a portion of the frame corresponding to a data portion.

9. The method of claim 8, wherein the step of generating the select signal further includes driving the select signal to select bits from the register during a portion of the frame corresponding to an end of frame sequence.

10. The method of claim 8, wherein the making data from the media access controller available includes receiving a data file for transmission from an upper layer application.

11. The method of claim 8, wherein scrambling the data from the media access controller provides for adequate bit transitions to limit electromagnetic noise outside a predefined transmission band.

12. The method of claim 8, further including serializing data received on the bus and making the data bits available to b scrambled in a serial format.

13. The method of claim 8, further including mapping the output data to predefined constellation coordinates to generate a base band data signal.

14. The method of claim 13, wherein the step of mapping includes selecting between at least two predefined constellations, each representing a separate payload encoding and the method further includes providing a signal to the media access controller Indicating a data rate at which the media access controller may provide data, the data rate corresponding to the payload encoding rate.

15. The method of claim 14, wherein the step of mapping further includes selecting between at least two baud rates and the signal to the media access controller provides a data rate corresponding to both the payload encoding rate and the baud rate.

16. A network transmitter generating data frames of data for transmission on a network medium, the transmitter including a frame generation circuit comprising:

a) a register storing a predefined bit sequence corresponding to a network standard training bit sequence;

b) a multiplexer with a first input receiving bits from the register corresponding to the network standard training bit sequence and a second input receiving bits representing the data for transmission, the multiplexer generating an output signal in accordance with a select signal; and c) a schedule circuit driving the select signal to select bits from the register during a portion of the frame corresponding to a frame training sequence and driving the select signal to select the data for transmission during a portion of the frame corresponding to a data portion, wherein the schedule circuit further drives the select signal to select bits from the register during a portion of the frame corresponding to an end of frame sequence.

\* \* \* \* \*